(12) United States Patent
Hosomi

(10) Patent No.: US 11,989,290 B2
(45) Date of Patent: May 21, 2024

(54) ACTION PLAN ESTIMATION APPARATUS, ACTION PLAN ESTIMATION METHOD, AND COMPUTER-READABLE RECORDING MEDIUM

(71) Applicant: NEC Corporation, Tokyo (JP)

(72) Inventor: Itaru Hosomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 17/427,250

(22) PCT Filed: Feb. 4, 2019

(86) PCT No.: PCT/JP2019/003922
§ 371 (c)(1),
(2) Date: Jul. 30, 2021

(87) PCT Pub. No.: WO2020/161780
PCT Pub. Date: Aug. 13, 2020

(65) Prior Publication Data
US 2022/0114253 A1 Apr. 14, 2022

(51) Int. Cl.
*G06F 21/55* (2013.01)
*G06N 5/02* (2023.01)

(52) U.S. Cl.
CPC .......... *G06F 21/554* (2013.01); *G06F 21/552* (2013.01); *G06N 5/02* (2013.01); *G06F 2221/034* (2013.01)

(58) Field of Classification Search
CPC ................. G06F 21/554; G06F 21/552; G06F 2221/034; G06F 21/566; G06N 5/02; G06N 5/041
See application file for complete search history.

(56) References Cited

U.S. PATENT DOCUMENTS

2016/0239661 A1 8/2016 Kawauchi
2017/0206479 A1* 7/2017 Iwasaki ................ G06Q 10/101
(Continued)

FOREIGN PATENT DOCUMENTS

| JP | 2002-318734 A | 10/2002 |
| WO | 2015/059791 A1 | 4/2015 |
| WO | 2016/027292 A1 | 2/2016 |

OTHER PUBLICATIONS

English translation of Written opinion for PCT Application No. PCT/JP2019/003922, dated May 7, 2019.
(Continued)

*Primary Examiner* — Mohammed Waliullah

(57) ABSTRACT

An action plan estimation apparatus 10 includes: an information acquisition unit 11 that acquires an operation log indicating an operation and a context information indicating a status of the operation for each operation performed by a software on a computer system, a group generation unit 12 that divides each of the operation logs into groups based on a similarity between the context information, an action plan estimation unit 13 that executes abduction for each group by applying knowledge data indicating a relationship between an action plan executed by the software and an operation of the software to the operation log included in the group, and uses the result of the abduction to estimate an action plan to reach a preset target state, that is executed by the software from which the operation log is acquired, based on the operation indicated by the operation log included in the group.

6 Claims, 11 Drawing Sheets

(56) References Cited

U.S. PATENT DOCUMENTS

2017/0270297 A1* 9/2017 Watanabe ............. G06F 21/552
2018/0075235 A1* 3/2018 Tajima .................. G06F 21/554

OTHER PUBLICATIONS

International Search Report for PCT Application No. PCT/JP2019/003922, dated May 7, 2019.

* cited by examiner

DEDUCTION detectMal(e1)
^substance(e1, "048f0172")
⇒ intrusion(P, "048f0172")

intrusion(P, "048f0172")
^unauthLogon(e2)^src(e2, "183.79.40.184")^dest(e2, "183.79.52.210")
⇒ lateralMovement(P, "183.79.40.184", "183.79.52.210")

ABDUCTION

*Assumption from knowledge data lateralMovement(P, "183.79.40.184", "183.79.52.210")^dataLeak(E, data, src, dest)
⇒ exfiltration(P, data, src)

exfiltration(P, data, src) ⇒ objectiveAchieved(P)

ACTION PLAN ESTIMATION APPARATUS, ACTION PLAN ESTIMATION METHOD, AND COMPUTER-READABLE RECORDING MEDIUM

This application is a National Stage Entry of PCT/JP2019/003922 filed on Feb. 4, 2019, the contents of all of which are incorporated herein by reference, in their entirety.

TECHNICAL FIELD

The present invention relates to an action plan estimation apparatus and an action plan estimation method for estimating an action plan of a software on a computer system, and further, a computer-readable recording medium that includes a program recorded thereon for realizing the apparatus and method.

BACKGROUND ART

In recent years, a role of computer systems has become more and more important in societies and organizations such as companies, and it is required to operate computer systems safely. Therefore, if a malicious third party launches some kind of cyber-attack on the computer system, it is important to be aware of the cyber-attack. And it is important to understand an action plan executed by the software (malware, virus, etc.) invaded by the cyber-attack and take the necessary measures as soon as possible.

However, recent cyber-attacks are carried out for various purposes, and it is not easy to understand the action plan executed by software that has invaded a computer system by a cyber-attack. To deal with such a problem, for example, Patent Document 1 discloses an analysis apparatus that detects a behavior of a malware in a cyber-attack, traces the functions related to the detected behavior, and estimates the purpose of the malware. According to the analysis apparatus disclosed in Patent Document 1, the purpose of the malware, that is, the purpose that an attacker is trying to achieve by using the malware, and the action plan formulated to achieve the purpose can be understand. Therefore, according to analysis apparatus in Patent Document 1, it is considered that the action of malware can be anticipated, and the cyber-attack can be swiftly responded to.

LIST OF RELATED ART DOCUMENTS

Patent Document

Patent Document 1: International Publication No. 2016/027292

SUMMARY OF INVENTION

Problems to be Solved by the Invention

Incidentally, previously, the majority of cyber-attacks were attacks aimed at self-revealing or damaging a credibility of dissatisfied organizations, such as spreading computer viruses and stopping services (DoS attacks, DDoS attacks). However, in recent years, the methods of cyber-attacks have diversified. In line with this, the action plans executed by software that has invaded computer systems are also diversifying.

Specifically, in recent years, attacks aimed at money, such as stealing confidential information aimed at obtaining money and demanding ransom by ransomware, have increased rapidly. And the methods of cyber-attacks are diversifying and becoming more sophisticated depending on the target. For example, malware that has invaded a target computer system is made to download various types of malwares. In this case, in the computer system, the malware infection gradually spreads, and a large number of malwares cooperate to search for information and erase traces.

On the other hand, the analysis apparatus disclosed in Patent Document 1 detects the behavior of malware by collating the operation of the software with patterns of the behavior of the malware defined in advance. Therefore, the analysis apparatus disclosed in Patent Document 1 may not be able to respond to an attack by new malware whose behavior does not match the pattern and may not be able to estimate an action plan.

An example of an object of the present invention is to provide an action plan estimation apparatus, an action plan estimation method, and a computer-readable recording medium that solve the above problems and can estimate an action plan executed by a software even when the methods of cyber-attacks by the software input from the outside are diversified.

Means for Solving the Problems

To achieve the aforementioned example object, an action plan estimation apparatus according to an example aspect of the present invention includes:
  an information acquisition unit configured to acquire an operation log indicating an operation and a context information indicating a status of the operation for each operation performed by a software on a computer system,
  a group generation unit configured to divide each of the operation logs into groups based on a similarity between the context information,
  an action plan estimation unit configured to execute abduction for each group by applying knowledge data indicating a relationship between an action plan executed by the software and an operation of the software to the operation log included in the group, and uses the result of the abduction to estimate an action plan to reach a preset target state, that is executed by the software from which the operation log is acquired, based on the operation indicated by the operation log included in the group.

Furthermore, to achieve the aforementioned example object, an action plan estimation method according to an example aspect of the present invention includes:
  (a) a step of acquiring an operation log indicating an operation and a context information indicating a status of the operation for each operation performed by a software on a computer system,
  (b) a step of dividing each of the operation logs into groups based on a similarity between the context information,
  (c) a step of executing abduction for each group by applying knowledge data indicating a relationship between an action plan executed by the software and an operation of the software to the operation log included in the group, and
using the result of the abduction to estimate an action plan to reach a preset target state, that is executed by the software from which the operation log is acquired, based on the operation indicated by the operation log included in the group.

Moreover, to achieve the aforementioned example object, a computer-readable recording medium according to an example aspect of the present invention has recorded therein a program including an instruction that causes a computer to execute:

(a) a step of acquiring an operation log indicating an operation and a context information indicating a status of the operation for each operation performed by a software on a computer system, (b) a step of dividing each of the operation logs into groups based on a similarity between the context information, (c) a step of executing abduction for each group by applying knowledge data indicating a relationship between an action plan executed by the software and an operation of the software to the operation log included in the group, and using the result of the abduction to estimate an action plan to reach a preset target state, that is executed by the software from which the operation log is acquired, based on the operation indicated by the operation log included in the group.

Advantageous Effects of the Invention

As described above, according to the present invention, it is possible to estimate an action plan executed by a software even when the methods of cyber-attacks by the software input from the outside are diversified.

EXAMPLE EMBODIMENT

First Example Embodiment

The following describes an action plan estimation apparatus, an action plan estimation method, and a program according to a first example embodiment with reference to FIG. 1 to FIG. 7.

[Apparatus Configuration]

Figure 1:
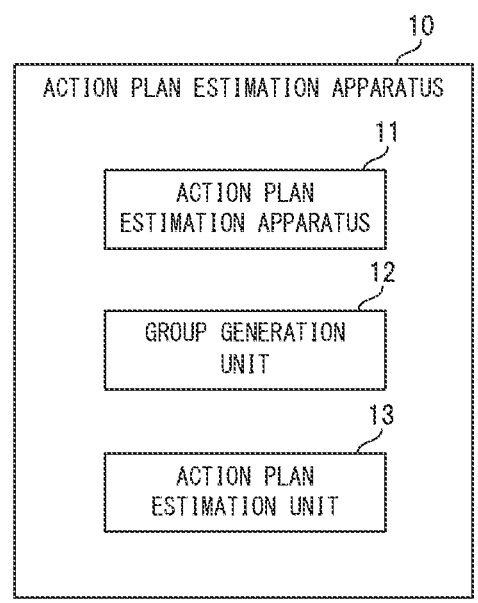
FIG. 1 is a block diagram showing a schematic configuration of an action plan estimation apparatus according to a first example embodiment.

First, a schematic configuration of the action plan estimation apparatus according to the first example embodiment will be described. FIG. 1 is a block diagram showing a schematic configuration of the action plan estimation apparatus according to the first example embodiment.

The action plan estimation apparatus 10 according to the first example embodiment shown in FIG. 1 is an apparatus that estimates the action plan executed by a software on a computer system. In the first example embodiment, "the action plan executed by the software" also includes an action plan of the person who wants to accomplish by using the software.

As shown in FIG. 1, the action plan estimation apparatus 10 includes an information acquisition unit 11, a group generation unit 12, and an action plan estimation unit 13. Of these, the information acquisition unit 11 acquires an operation log indicating an operation and context information indicating a status of the operation for each operation performed by the software on the computer system. The group generation unit 12 divides each of the operation log into groups based on a similarity between the context information.

First, the action plan estimation unit 13 execute abduction for each group by applying knowledge data indicating a relationship between an action plan executed by the software and an operation of the software to the operation log included in the group. Subsequently, the action plan estimation unit 13 uses the result of the abduction to estimate the action plan to reach a preset target state, that is executed by the software from which the operation log is acquired, based on the operation indicated by the operation log included in the group.

As described above, in the first example embodiment, the action plan is estimated using the result of abduction. The abduction is executed by applying the knowledge data indicating the relationship between the action plan and the operation to the operation logs related to each other. That is, in the first example embodiment, the action plan is estimated without depending only on a behavior of the software. Therefore, according to the first example embodiment, it is possible to estimate the action plan executed by the software even when the methods of cyber-attacks by the software input from the outside are diversified.

Figure 2:
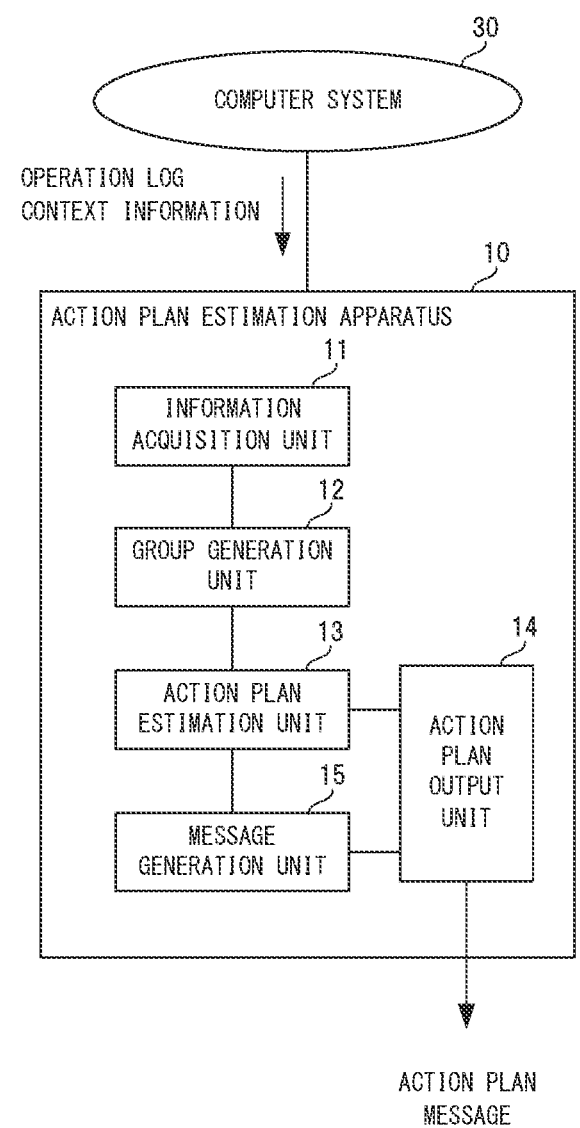
FIG. 2 is a block diagram showing a specific configuration of the action plan estimation apparatus according to the first example embodiment.

Next, the specifics of the configuration of the action plan estimation apparatus 10 according to the first example embodiment will be described using FIG. 2. FIG. 2 is a block diagram showing the specific configuration of the action plan estimation apparatus according to the first example embodiment.

As shown in FIG. 2, in the first example embodiment, the action plan estimation apparatus 10 is connected to the computer system 30. The computer system 30 is constructed by a large number of computers connected via a network. The action plan estimation apparatus 10 estimates the action plan executed by software running on the computer system 30, particularly software that attacks the computer system 30 such as malware.

In the first example embodiment, the information acquisition unit 11 first collects the operation log from the computer system 30 and acquires the context information associated therewith from the collected operation log. The context information is, for example, information including an operation execution time (start time), an operation execution place, an operation subject, an operation target, and the like.

In the first example embodiment, for example, a plurality of operations matches in any one of the operation execution time (start time), the operation execution place, the operation subject, and the operation target included in each context information. In this case, the group generation unit 12 determines that these operation logs are related and sets them as the same group.

For example, the operation execution times are determined to match when the difference between each operation execution times in the context information of each of the two operation logs is less than or equal to a threshold value (within 1 hour, within 1 week, etc.). The operation execution places are determined to match when each area where each operation log is acquired is in the same area (on the same host machine, on the same domain network, within the infection range, etc.). In addition, the operation execution places are determined to match when a spatial distance or a network distance between the locations where each operation was performed is less than a threshold value (acquisition sources of the operation logs is in a same department or a cooperation department, etc.).

Further, the operation subjects are determined to match when the user accounts associated with each of the two operations logs are the same, or when the user accounts associated with each of the two operation logs have same authority level. Furthermore, the operation subjects are determined to match when each software that executed the operation are the same malware, or when each software that executed the operation are that have been used in the same attack. The operation targets are determined to match when each object that are targeted in each of the two operation logs are the same, or when each object that are targeted in each of the two operation logs are the same family As described above, the action plan estimation unit 13 first execute abduction for each group by applying knowledge data to the operation logs included in each group. In this case, the knowledge data is expressed by an implication relation rule of the first-order predicate logic expression in the first example embodiment.

Knowledge data is expressed in the form of, for example, "pre-state (premise)^action (achievement state)=>post-state (result)". This form indicates that if both the presupposed pre-state and the action (achievement state) are true, the post-state, which is an inevitable consequence, is derived. Further, in this form, the pre-state and the action are the necessary conditions for the post-state to be established. In addition, the "pre-state^act" is a sufficient condition for the post-state to be established. The act can also be expressed by the conjunction of multiple propositions. For example, the knowledge data may be expressed as "pre-state^act 1^act 2=.>post-state".

Specific examples of knowledge data include "malware intrusion (Event1, Ma1)^unauthorized logon (Event2, Host, Host1)=>infection spread (Plan, Ma1, Host1)". In this case, Event1, Ma1, Host, etc. are variables called "terms" of each predicate. A logical expression in which a specific value is entered in a "term" is called an "observation". An example is "illegal logon ("e1", "10.23.123.1")".

As described above, the action plan estimation unit 13 uses the result of the abduction to estimate the action plan to reach a preset target state, that is executed by the software from which the operation log is acquired, based on the operation indicated by the operation log included in the group. Specifically, the action plan estimation unit 13 uses the result of abduction to estimate the action executed by the software from the operation indicated by the operation log to the time when the target state is reached. Here, examples of the "target state" include a state in which confidential information is transmitted to the outside, a state in which the requested amount of money is remitted, and the like.

As shown in FIG. 2, the action plan estimation apparatus 10 includes an action plan output unit 14 and a message generation unit 15 in addition to the information acquisition unit 11, the group generation unit 12, and the action plan estimation unit 13.

The message generation unit 15 specifies an operation required for establishing an element that is not directly linked to the operation log from the result of abduction. Then, the message creation unit 15 estimates the context information indicating the status of the specified operation by using the context information of the operation log and generates a message about the action plan by using the estimated context information.

The action plan output unit 14 outputs the estimated action plan to an external device such as a display device or a terminal device. As a result, the action plan is displayed on a screen of the display device or the terminal device. Further, when the message is generated by the message generation unit 15, the action plan output unit 14 can output the generated message to the external device in addition to the estimated action plan.

[Apparatus Operations]

Figure 3:
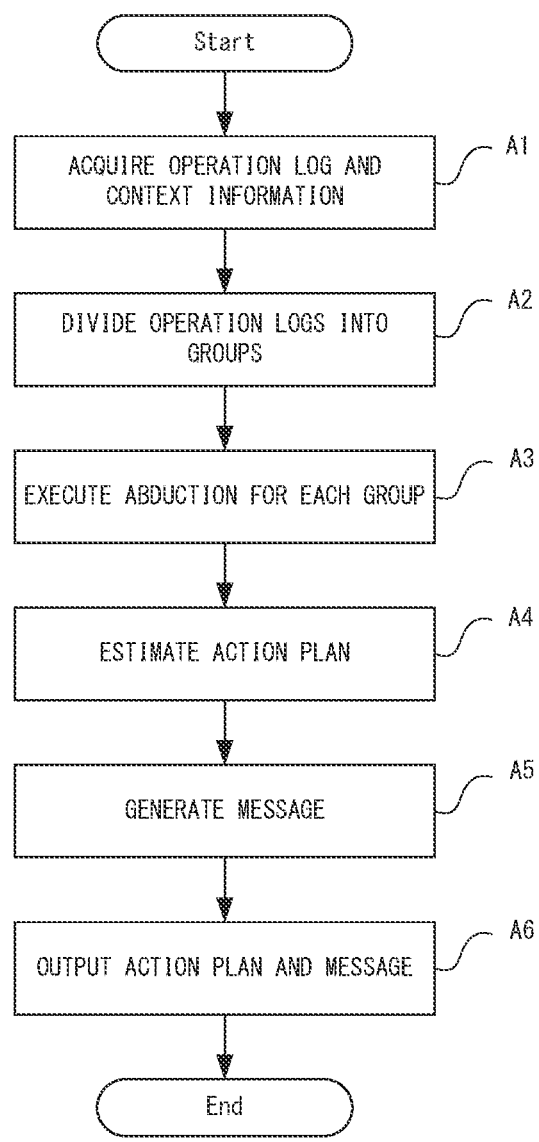
FIG. 3 is a flow diagram showing operations of the action plan estimation apparatus according to the first example embodiment.

Next, the operations of the action plan estimation apparatus 10 according to the first example embodiment will be described using FIG. 3. FIG. 3 is a flow diagram showing operations of the action plan estimation apparatus according to the first example embodiment. In the following description, FIG. 1 and FIG. 2 will be referred to as appropriate. Furthermore, in the first example embodiment, the action plan estimation method is carried out by causing the action plan estimation apparatus 10 to operate. Therefore, the following description of the operations of the action plan estimation apparatus 10 applies to the action plan estimation method according to the first example embodiment.

As shown in FIG. 3, first, the information acquisition unit 11 acquires the operation log indicating the operation and context information thereof for each operation performed by the software on the computer system 30 (step A1). Specifically, the information acquisition unit 11 collects the operation log from the computer system 30 and acquires context information associated therewith from the collected operation log.

Next, the group generation unit 12 divides each of the operation logs acquired in step A1 into groups based on the similarity between the context information (step A2). Specifically, when a plurality of operations matches in any one of the operation execution time (start time), the operation execution place, the operation subject, and the operation target included in each context information, the group generation unit 12 determines that these operation logs are related, and sets them as the same group.

Next, the action plan estimation unit 13 execute abduction for each group by applying knowledge data to the operation logs included in each group (step A3).

Next, the action plan estimation unit 13 uses the result of the abduction in the step A3 to estimate the action plan to reach the preset target state, that is executed by the software from which the operation log is acquired, based on the operation indicated by the operation log included in the group (step A4).

Next, the message generation unit 15 generates the message about the action plan estimated in step A4 (step A5). Specifically, the message generation unit 15 specifies the operation required for establishing the element that is not directly linked to the operation log from the result of abduction. Then, the message generation unit 15 estimates the context information indicating the status of the specified operation by using the context information of the operation log and generates the message about the action plan by using the estimated context information.

Next, the action plan output unit 14 outputs the action plan estimated in step A4, and the message generated in step A5 to the external device such as the display device or the terminal device (step A6).

[Specific Example]

Here, a specific example of the operation of the action plan estimation apparatus 10 according to the first example embodiment will be described with reference to FIGS. 4 to 7. Further, the description of the specific example will be performed according to each step shown in FIG. 3 described above.

Step A1

Figure 4:
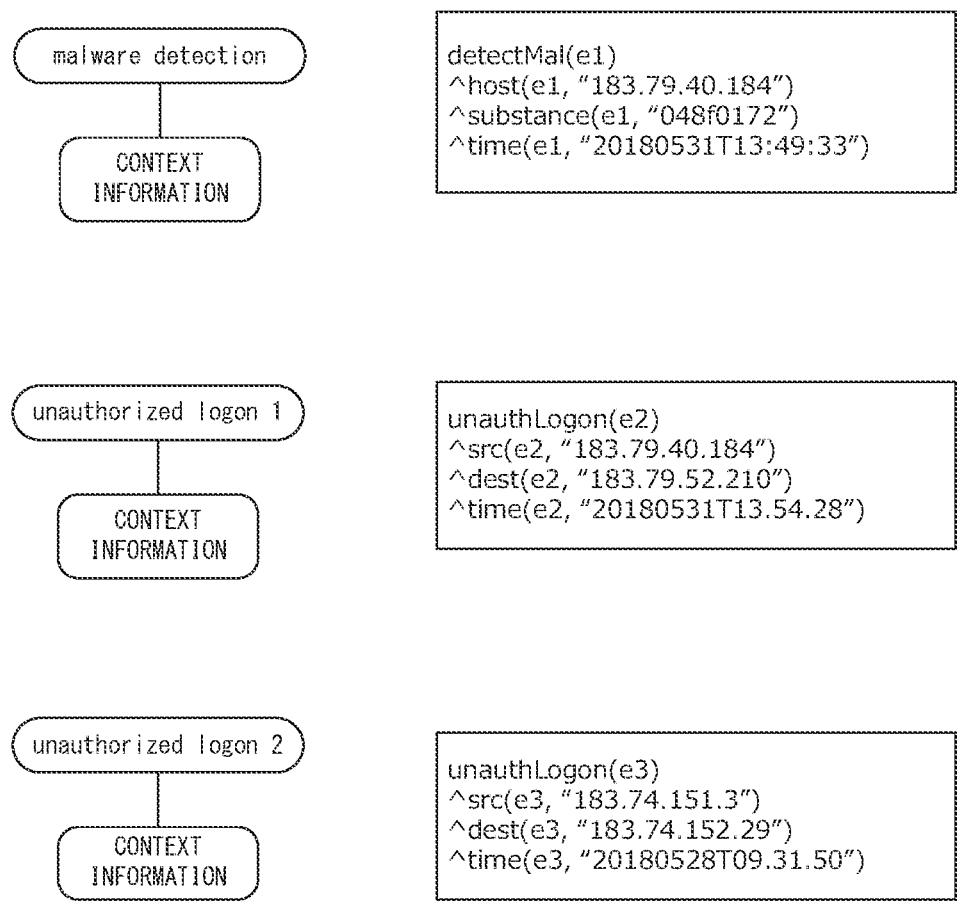
FIG. 4 is a diagram showing an example of an operation log and context information acquired in step A1 shown in FIG. 3.

The information acquisition unit 11 acquires the operation log and the context information associated therewith shown in FIG. 4. FIG. 4 is a diagram showing an example of an operation log and context information acquired in step A1 shown in FIG. 3. In the example of FIG. 4, "malware detection", "unauthorized logon 1", and "unauthorized logon 2" are acquired as operation logs. Further, in FIG. 4, the operation log and the context information are schematically shown on the left side, and these logical expressions are shown on the right side.

Step A2

Figure 5:
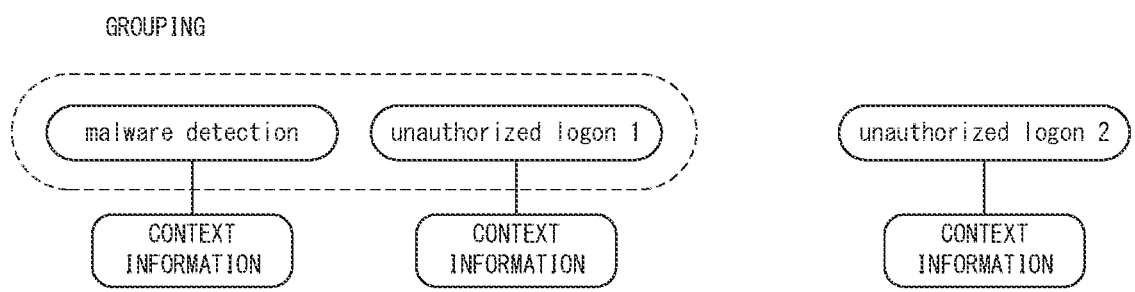
FIG. 5 is a diagram showing an example of groups generated in step A2 shown in FIG. 3.

As shown in FIG. 5, the group generation unit 12 divides each operation log acquired in step A1 into groups based on the similarity between the context information. FIG. 5 is a diagram showing an example of groups generated in step A2 shown in FIG. 3. As shown in FIG. 4, the operation subject and the operation execution place are the same in "malware detection" and "unauthorized logon 1". Therefore, in the example of FIG. 5, these operations are in the same group.

Steps A3 and A4

Figure 6:
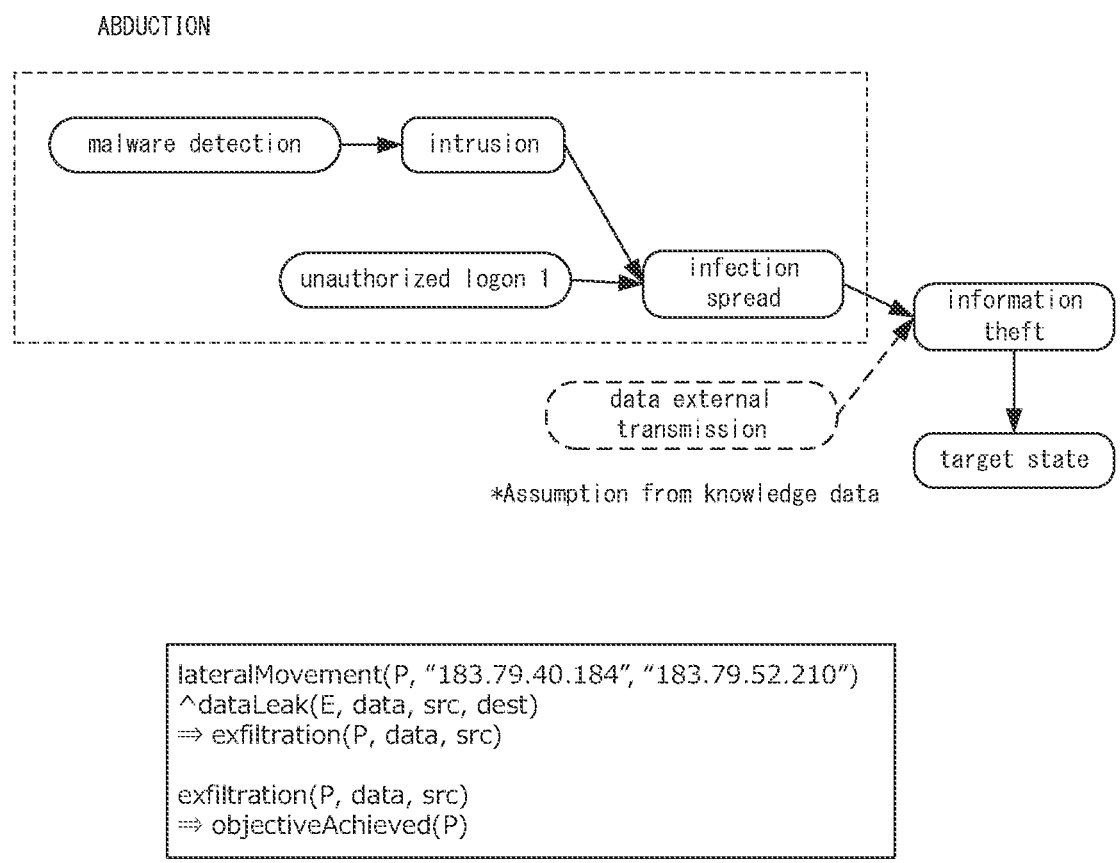
FIG. 6 is a diagram showing an example of an action plan estimated by abduction in step A3 shown in FIG. 3.

The action plan estimation unit 13 applies the knowledge data to the operation logs included in the group shown in FIG. 5 to execute abduction. Then, the action plan estimation unit 13 estimates the action plan based on the result of the abduction, as shown in FIG. 6. FIG. 6 is a diagram showing an example of an action plan estimated by abduction in step A3 shown in FIG. 3. In the example of FIG. 6, "malware detection" and "unauthorized 1 logon 1" included in the group created in step A2 are set as a starting point, and the ending point is set as the "target state". Based on the abduction, the actions performed by the malware from the start point to the end point are derived.

The "data external transmission" surrounded by the broken line in FIG. 6 is not an operation acquired in the operation log. However, "data external transmission" is also estimated by the abduction by the action plan estimation unit 13.

Step A5

The message generation unit 15 specifies an act that is not directly linked to the operation log acquired in step A1 among the "acts" included in the abduction obtained in step A3. In the example of FIG. 6, "external data transmission" corresponds to this act. Subsequently, the message generation unit 15 uses the knowledge data to specify the operation necessary for establishing the "data external transmission". Specifically, the message generation unit 15 uses the knowledge data to specify "information theft" as the operation necessary for establishing "external data transmission".

Next, the message generation unit 15 estimates the context information of "data external transmission" based on the context information of the operation log acquired in step A1, for example, the context information of "unauthorized logon 1", which is located immediately before "information theft" specified as the operation necessary for establishment and is a necessary condition for "infection spread". Specifically, the message generation unit 15 extracts the values of the operation execution time (time), the operation subject (agent), and the operation execution place (src, dest) in the context information of "unauthorized logon 1" (see FIG. 4).

Next, the message generation unit 15 sets the operation execution time of the "data external transmission" after the extracted operation execution time, and sets the operation subject, the operation target, and the operation execution place to the extracted ones. Then, the message generation unit 15 generates the message by using the unconfirmed operation "data external transmission" and the context information set for the "external data transmission". As an example of the message is ""Data external transmission "related to" Information theft" may be performed on "183.79.40.183" or "183.79.52.210" with the authority of "admin01" after "2018/05/31 13:54:28".

Step A6

Figure 7:
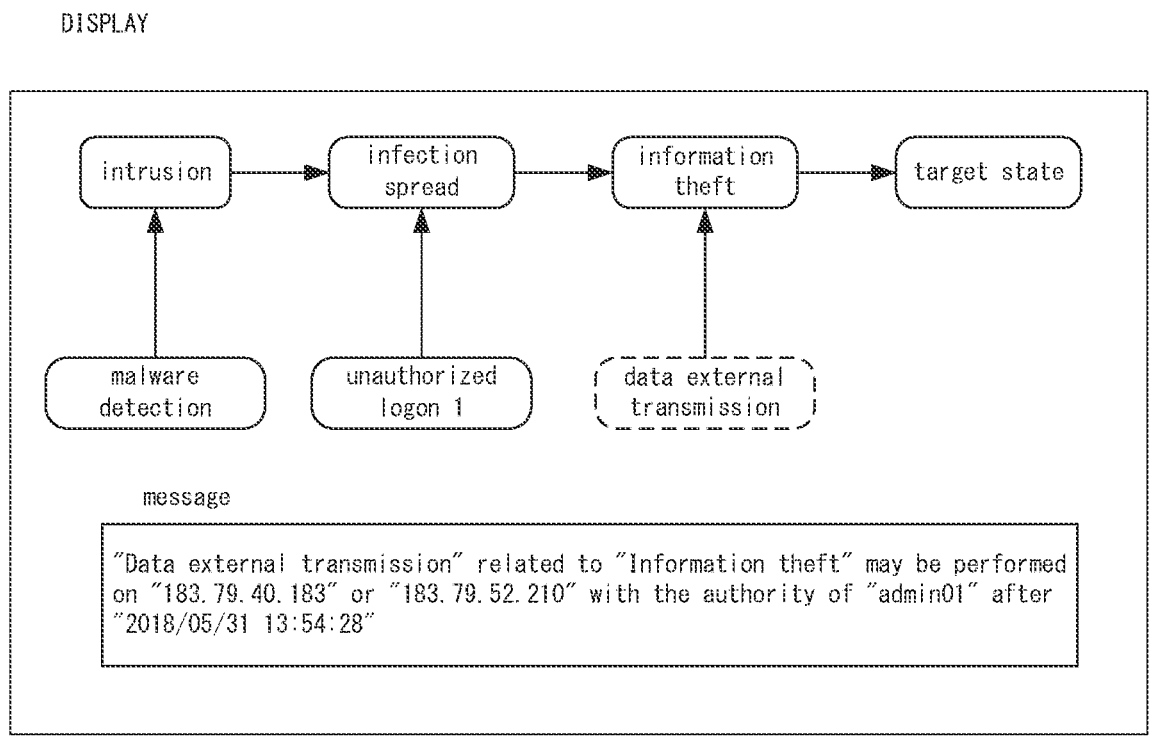
FIG. 7 is a diagram showing an example of an action plan and a message displayed on a screen by executing step A6 shown in FIG. 3.

Next, as shown in FIG. 7, the action plan output unit 14 outputs the action plan estimated in step A4, and the message generated in step A5 to an external device. FIG. 7 is a diagram showing an example of an action plan and a message displayed on a screen by executing step A6 shown in FIG. 3. In the example of FIG. 7, the action plan and the message are displayed on the screen.

[Effects of the First Example Embodiment]

As described above, in the first example embodiment, when software, specifically malware, tries to operate on the computer system 30, what malware is trying to do and in what procedure (action plan) is estimated, and the estimation result is presented. In addition, since the action plan is estimated using the abduction, it is possible to estimate the action plan even when the methods of cyber-attacks are diversified. Further, in the first example embodiment, a message is generated and presented to assist in the interpretation of this action plan. Therefore, the administrator of the computer system 30 can quickly take an appropriate response.

[Program]

It is sufficient for the program according to the first example embodiment to be a program that causes a computer to execute steps A1 to A6 shown in FIG. 3. The action plan estimation apparatus and the action plan estimation method according to the first example embodiment can be realized by installing this program in the computer and executing this program. In this case, a processor of the computer functions as the information acquisition unit 11, the group generation unit 12, the action plan estimation unit 13, the action plan output unit 14, and the message generation unit 15, and performs processing.

Furthermore, the program according to the first example embodiment may be executed by a computer system constructed with a plurality of computers. In this case, for example, each computer may function as one of the information acquisition unit 11, the group generation unit 12, the action plan estimation unit 13, the action plan output unit 14, and the message generation unit 15.

Second Example Embodiment

Figure 8:
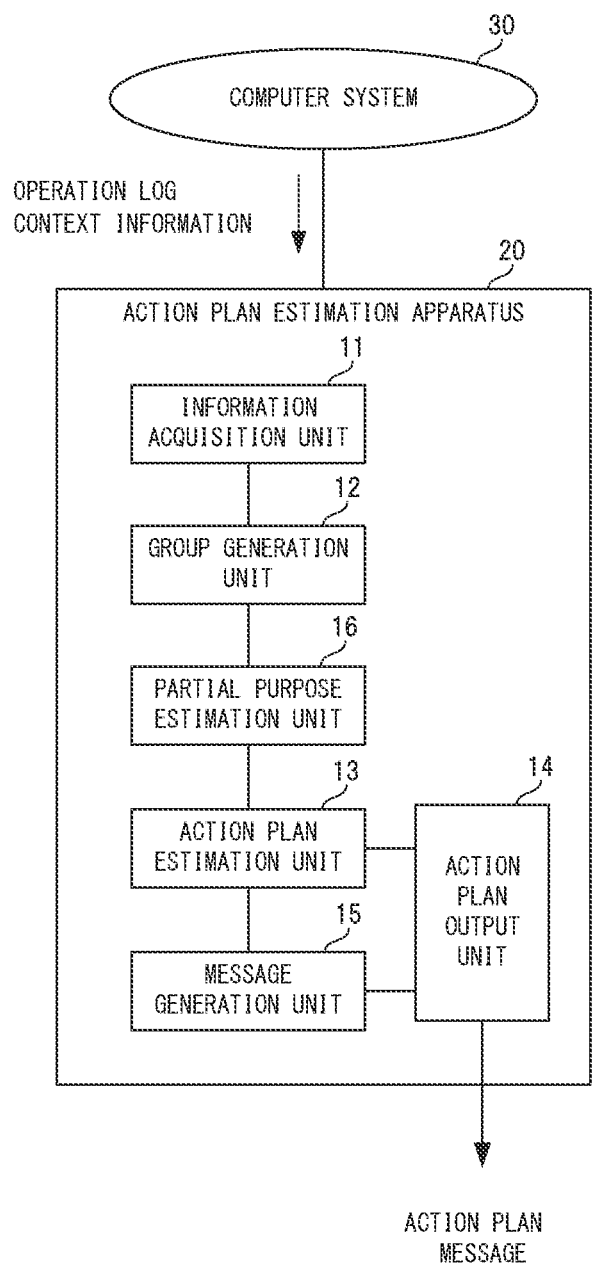
FIG. 8 is a block diagram showing a configuration of an action plan estimation apparatus according to the second example embodiment.
Figure 9:
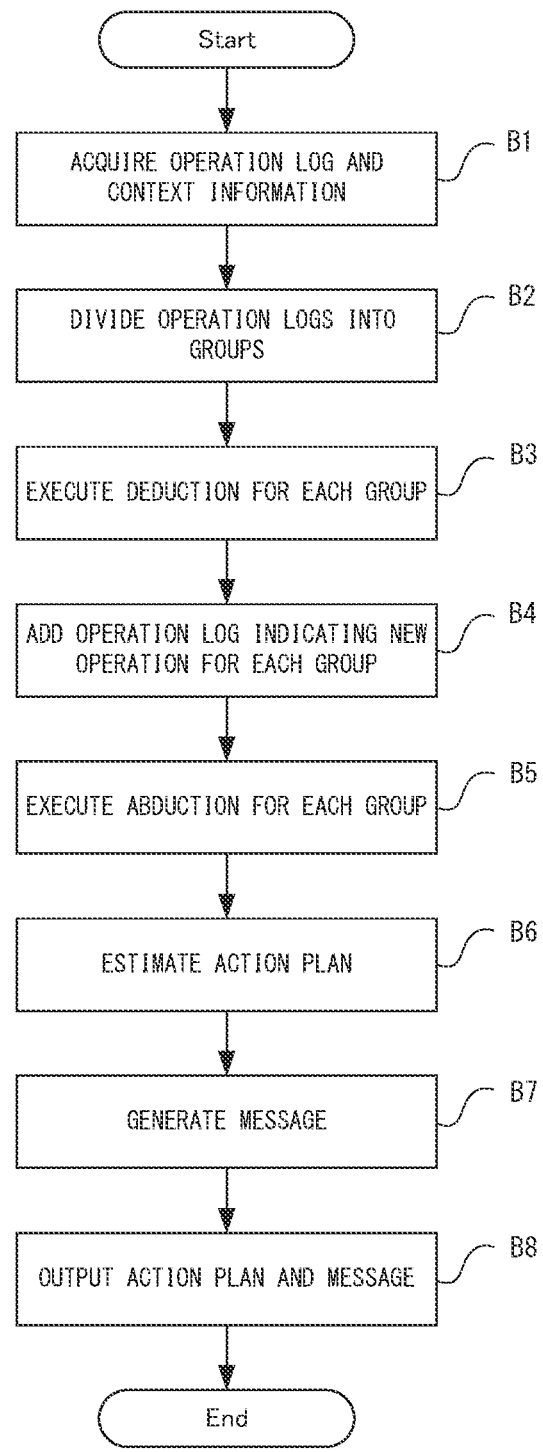
FIG. 9 is a flow diagram showing operations of the action plan estimation apparatus according to the second example embodiment.

The following describes an action plan estimation apparatus, an action plan estimation method, and a program according to a second example embodiment with reference to FIG. 8 to FIG. 10.

[Apparatus Configuration]

First, a configuration of the action plan estimation apparatus according to the second example embodiment will be described. FIG. 8 is a block diagram showing a configuration of an action plan estimation apparatus according to the second example embodiment.

As shown in FIG. 8, the action plan estimation apparatus 20 in the second example embodiment includes, similar to the action plan estimation apparatus 10 in the first embodiment shown in FIG. 2, includes the information acquisition unit 11, the group generation unit 12, the action plan estimation unit 13, the action plan output unit 14, and the message generation unit 15

However, in the second example embodiment, the action plan estimation apparatus 20 also includes the partial purpose estimation unit 16 in addition to these, which is different from the action plan estimation apparatus 10 in the first example embodiment. Hereinafter, the differences from the first example embodiment will be mainly described.

First, the partial purpose estimation unit 16 applies the operation log included in the group to the knowledge data for each group to execute deduction. Further, the partial purpose estimation unit 16 use a result of the deduction to specify a new operation derived from the operation indicated by the operation log and add the operation log indicating the specified new operation to the group.

Further, in the second example embodiment, the action plan estimation unit 13 estimates the action plan executed by the software for each group to which the operation log indicating the new operation is added by the partial purpose estimation unit 16.

[Apparatus Operations]

Next, the operations of the action plan estimation apparatus 20 according to the second example embodiment will be described using FIG. 9 is a flow diagram showing operations of the action plan estimation apparatus according to the second example embodiment. In the following description, FIG. 8 will be referred to as appropriate. Furthermore, in the second example embodiment, the action plan estimation method is carried out by causing the action plan estimation apparatus 20 to operate. Therefore, the following description of the operations of the action plan estimation apparatus 20 applies to the action plan estimation method according to the second example embodiment.

As shown in FIG. 8, first, the information acquisition unit 11 acquires the operation log indicating the operation and context information thereof for each operation performed by the software on the computer system 30 (step B1). Step B1 is the same step as step A1 shown in FIG. 3.

Next, the group generation unit 12 divides each of the operation logs acquired in step B1 into groups based on the similarity between the context information (step B2). Step B2 is the same step as step A2 shown in FIG. 3.

Next, the partial purpose estimation unit 16 applies the operation log included in the group to the knowledge data for each group generated in step B2 and executes deduction (step B3). Subsequently, the partial purpose estimation unit 16 use a result of the deduction to specify a new operation derived from the operation indicated by the operation log acquired in step B1 and add the operation log indicating the specified new operation to the group (step B4).

Next, when the action log indicating new operation is added to each group, the action plan estimation unit 13, the action plan estimation unit 13 applies the knowledge data to the operation logs included in the group for each group to which the action log is added, and executes abduction (step B5).

Next, the action plan estimation unit 13 uses the result of the abduction in the step B5 to estimate the action plan to reach the preset target state, that is executed by the software from which the operation log is acquired, based on the operation indicated by the operation log included in the group (step B6). Step B6 is the same step as step A4 shown in FIG. 3.

Next, the message generation unit 15 generates the message about the action plan estimated in step B6 (step B7). Step B7 is the same step as step A5 shown in FIG. 3.

Next, the action plan output unit 14 outputs the action plan estimated in step B6, and the message generated in step B7 to the external device such as the display device or the terminal device (step B8).

Step B8 is the same step as step A6 shown in FIG. 3.

[Specific Example]

Figure 10A:
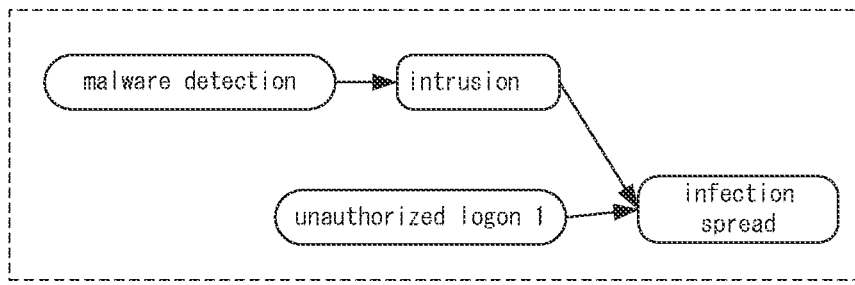
FIG. 10A is a diagram showing an example of the processes of steps B3 and B4 shown in FIG. 9.
Figure 10B:
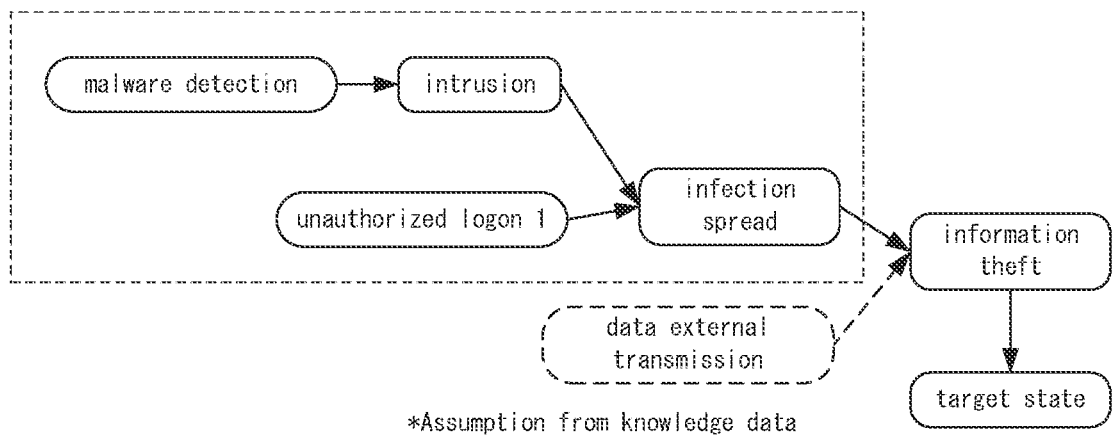
FIG. 10B is a diagram showing an example of the processes of steps B5 and B6 shown in FIG. 9.

Here, a specific example of the operation of the action plan estimation apparatus 20 according to the second example embodiment will be described with reference to FIGS. 10A and 10B. FIG. 10A is a diagram showing an example of the processes of steps B3 and B4 shown in FIG. 9, and FIG. 10B is a diagram showing an example of the processes of steps B5 and B6 shown in FIG. 9. Further, the description of the specific example will be performed according to each step shown in FIG. 9 described above.

Step B1

In the second example embodiment, the information acquisition unit 11 acquires, for example, the operation log shown in FIG. 4 and the context information associated therewith, as in the first example embodiment.

Step B2

In the second example embodiment, the group generation unit 12 divides each operation log acquired in step B1 into groups based on the similarity between the context information, as in the first example embodiment.

Steps B3 and B4

The partial purpose estimation unit 16 applies the operation acquired in step B1 to knowledge data to the operation acquired in step B1 and executes deduction. As a result, as shown in FIG. 10A, the act "intrusion" is derived for "malware detection", and "infection spread" is derived for the "intrusion" and "unauthorized logon 1". In addition, when deductive is executed for "invasion", "infection spread" is derived. Therefore, as shown in FIG. 10A, when both "malware detection" and "unauthorized logon 1" are obtained, "intrusion" and "infection spread" are added.

Steps B5 and B6

The action plan estimation unit 13 applies knowledge data to the operation logs included in the group to which the operation log is added, which is shown in FIG. 10A and executes abduction. Then, the action plan estimation unit 13 estimates the action plan as shown in FIG. 10B. In the example of FIG. 10B, "malware detection" and "Unauthorized 1 logon 1" included in the group created in step B2 are set as a starting point, and the ending point is set as the "target state". Based on the abduction, the actions performed by the malware from the start point to the end point are derived, as the example of FIG. 6 in the first example embodiment.

Step B7

Also, in the second example embodiment, the message generation unit 15 generates the message in the same manner as the example shown in the first example embodiment. As an example of the message is ""Data external transmission "related to" Information theft" may be performed on "183.79.40.183" or "183.79.52.210" with the authority of "admin01" after "2018/05/31 13:54:28".

Step B8

In the second example embodiment, the action plan output unit 14 outputs the action plan estimated in step B6, and the message generated in step B7 to an external device, as shown in FIG. 7.

[Effect of the Second Example Embodiment]

As described above, in the second example embodiment, the deduction is executed, so that a phenomenon based on the fact can be added, and then the abduction is executed. Therefore, according to the second example embodiment, the accuracy in abduction can be improved as compared with the first embodiment. The action plan obtained in the above-mentioned specific example is the same as the action plan obtained in the specific example shown in the first example embodiment. But as the number of acquired operation logs increases, the accuracy in abduction is improved as compared with the first embodiment.

In addition, deduction has a smaller processing load than abduction and can be processed at high speed. As the number of operation logs (observations) linked to the abduction increases, the proportion of phenomena that can be derived by deduction increases, so the knowledge data to be searched by abduction is limited. As a result, according to the second example embodiment, the processing time can be shortened.

Further, also in the second example embodiment, as in the first example embodiment, it is possible to estimate the action plan even when the methods of cyber-attacks are diversified. Further, in the second example embodiment, as in the first example embodiment, a message is generated and presented to assist in the interpretation of this action plan. Therefore, the administrator of the computer system 30 can quickly take an appropriate response.

[Program]

It is sufficient for the program according to the first example embodiment to be a program that causes a computer to execute steps B1 to B8 shown in FIG. 9. The action plan estimation apparatus and the action plan estimation method according to the second example embodiment can be realized by installing this program in the computer and executing this program. In this case, a processor of the computer functions as the information acquisition unit 11, the group generation unit 12, the action plan estimation unit 13, the action plan output unit 14, the message generation unit 15, and the partial purpose estimation unit 16, and performs processing.

Furthermore, the program according to the first example embodiment may be executed by a computer system constructed with a plurality of computers. In this case, for example, each computer may function as one of the information acquisition unit 11, the group generation unit 12, the action plan estimation unit 13, the action plan output unit 14, the message generation unit 15, and the partial purpose estimation unit 16.

(Physical Configuration)

Figure 11:
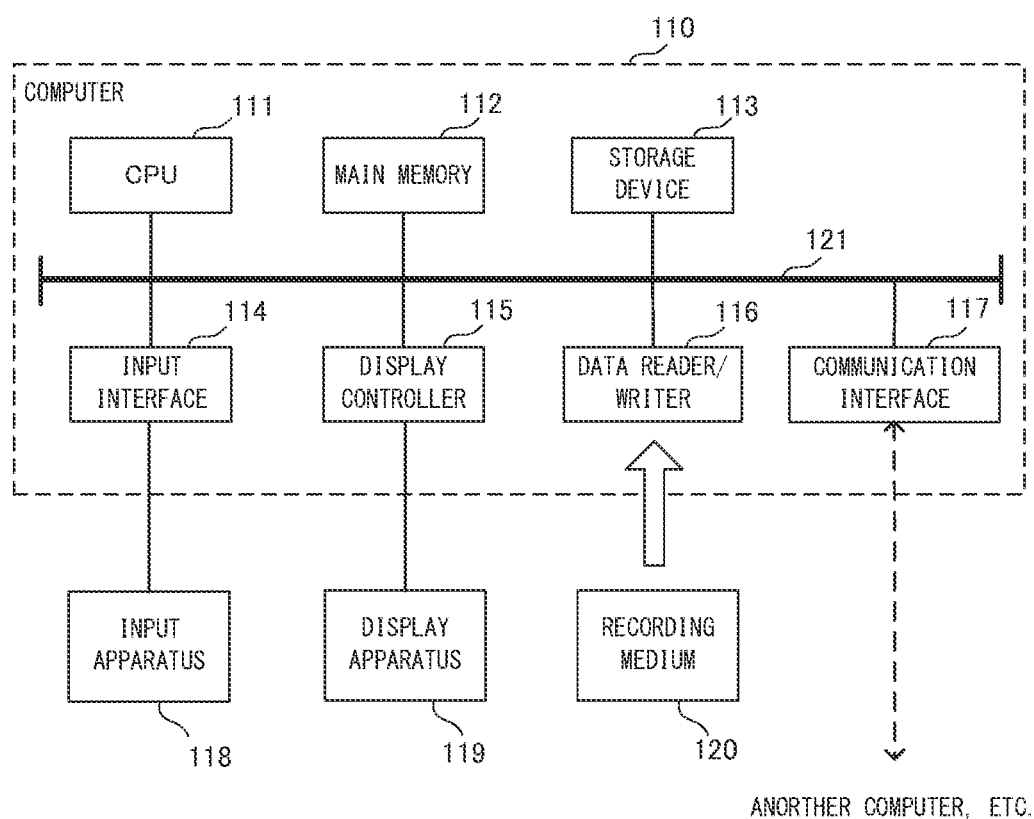
FIG. 11 is a block diagram showing an example of a computer that realizes the action plan estimation apparatus according to the first and second example embodiments.

The following describes a computer that realizes the action plan estimation apparatus by executing the program according to the first and second example embodiment with reference to FIG. 11. FIG. 11 is a block diagram showing an example of a computer that realizes the action plan estimation apparatus according to the first and second example embodiments.

As shown in FIG. 11, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111, or in place of the CPU 111.

The CPU 111 carries out various types of calculation by deploying the program (codes) according to the present example embodiment stored in the storage device 113 to the main memory 112 and executing the codes in a predetermined order. The main memory 112 is typically a volatile storage device, such as a DRAM (dynamic random-access memory). Also, the program according to the present example embodiment is provided in a state where it is stored in a computer-readable recording medium 120. Note that the program according to the present example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input apparatus 118, such as a keyboard and a mouse. The display controller 115 is connected to a display apparatus 119, and controls display on the display apparatus 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the action plan estimation apparatus 10 according to the present example embodiment can also be realized by using items of hardware that respectively correspond to the components, rather than the computer in which the program is installed. Furthermore, a part of the action plan estimation apparatus 10 may be realized by the program, and the remaining part of the action plan estimation apparatus 10 may be realized by hardware.

A part or an entirety of the above-described example embodiment can be represented by (Supplementary Note 1) to (Supplementary Note 12) described below, but is not limited to the description below.

(Supplementary Note 1)

An action plan estimation apparatus, including:

an information acquisition unit configured to acquire an operation log indicating an operation and a context information indicating a status of the operation for each operation performed by a software on a computer system, a group generation unit configured to divide each of the operation logs into groups based on a similarity between the context information, an action plan estimation unit configured to execute abduction for each group by applying knowledge data indicating a relationship between an action plan executed by the software and an operation of the software to the operation log included in the group, and uses the result of the abduction to estimate an action plan to reach a preset target state, that is executed by the software from which the operation log is acquired, based on the operation indicated by the operation log included in the group.

(Supplementary Note 2)

The action plan estimation apparatus to Supplementary Note 1, further comprising:

an action plan output unit configured to output the estimated action plan to the outside.

(Supplementary Note 3)

The action plan estimation apparatus to Supplementary Note 2, further comprising:

a message generation unit configured to specify an operation required for establishing an element that is not directly linked to the operation log, and estimate a context information indicating the status of the specified operation by using the context information of the operation log, and further, generate a message about the action plan by using the estimated context information, wherein the action plan output unit output the generated message in addition to the estimated action plan to the outside.

(Supplementary Note 4)

The action plan estimation apparatus to any of Supplementary Notes 1 to 3, further comprising:

a partial purpose estimation unit configured to applies the operation log included in the group to the knowledge data for each group to execute deduction, and use a result of the deduction to specify a new operation derived from the operation indicated by the operation log, and add the operation log indicating the specified new operation to the group, wherein the action plan estimation unit estimates the action plan executed by the software for each group to which the operation log indicating the new operation is added.

(Supplementary Note 5)

An action plan estimation method, including:

(a) a step of acquiring an operation log indicating an operation and a context information indicating a status of the operation for each operation performed by a software on a computer system, (b) a step of dividing each of the operation logs into groups based on a similarity between the context information, (c) a step of executing abduction for each group by applying knowledge data indicating a relationship between an action plan executed by the software and an operation of the software to the operation log included in the group, and using the result of the abduction to estimate an action plan to reach a preset target state, that is executed by the software from which the operation log is acquired, based on the operation indicated by the operation log included in the group.

(Supplementary Note 6)

The action plan estimation method to Supplementary Note 5, further comprising:

(d) a step of outputting the estimated action plan to the outside.

(Supplementary Note 7)

The action plan estimation method to Supplementary Note 6, further comprising:

(e) a step of specifying an operation required for establishing an element that is not directly linked to the operation log, and estimating a context information indicating the status of the specified operation by using the context information of the operation log, and further, generating a message about the action plan by using the estimated context information, wherein, in the (d) step, the generated message is output in addition to the estimated action plan to the outside.

(Supplementary Note 8)

The action plan estimation method to any of Supplementary Notes 5 to 7, further comprising:

(f) a step of applying the operation log included in the group to the knowledge data for each group to execute deduction, and using a result of the deduction to specify a new operation derived from the operation indicated by the operation log, and adding the operation log indicating the specified new operation to the group, wherein, in the (c) step, the action plan executed by the software is estimated for each group to which the operation log indicating the new operation is added.

(Supplementary Note 9)

A computer-readable recording medium that includes a program, the program including instructions that cause a computer to carry out:

(a) a step of acquiring an operation log indicating an operation and a context information indicating a status of the operation for each operation performed by a software on a computer system, (b) a step of dividing each of the operation logs into groups based on a similarity between the context information, (c) a step of executing abduction for each group by applying knowledge data indicating a relationship between an action plan executed by the software and an operation of the software to the operation log included in the group, and using the result of the abduction to estimate an action plan to reach a preset target state, that is executed by the software from which the operation log is acquired, based on the operation indicated by the operation log included in the group.

(Supplementary Note 10)

The computer-readable recording medium according to Supplementary Note 9, wherein the program further includes an instruction that causes the computer to carry out:

(d) a step of outputting the estimated action plan to the outside.

(Supplementary Note 11)

The computer-readable recording medium according to Supplementary Note 10, wherein the program further includes an instruction that causes the computer to carry out:

(e) a step of specifying an operation required for establishing an element that is not directly linked to the operation log, and estimating a context information indicating the status of the specified operation by using the context information of the operation log, and further, generating a message about the action plan by using the estimated context information, wherein, in the (d) step, the generated message is output in addition to the estimated action plan to the outside.

(Supplementary Note 12)

The computer-readable recording medium according to any of Supplementary Notes 9 to 11, wherein the program further includes an instruction that causes the computer to carry out:

(f) a step of applying the operation log included in the group to the knowledge data for each group to execute deduction, and using a result of the deduction to specify a new operation derived from the operation indicated by the operation log, and adding the operation log indicating the specified new operation to the group, wherein, in the (c) step, the action plan executed by the software is estimated for each group to which the operation log indicating the new operation is added.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

As described above, according to the present invention, it is possible to estimate the action plan executed by the software even when the methods of cyber-attacks by the software input from the outside are diversified. The present invention is useful for various systems where software may be input externally.

REFERENCE SIGNS LIST 10 action plan estimation apparatus (the first example embodiment)
11 information acquisition unit
12 group generation unit
13 action plan estimation unit
14 action plan output unit
15 message generation unit
16 partial purpose estimation unit
20 action plan estimation apparatus (the second example embodiment)
30 computer system
110 computer
111 CPU
112 main memory
113 storage device
114 input interface
115 display controller
116 data reader/writer
117 communication interface
118 input apparatus
119 display apparatus
120 recording medium
121 bus

What is claimed is:

1. An action plan estimation apparatus, comprising:
at least one processor; and
a memory storing instructions executable by the at least one processor to:
for each of a plurality of operations performed by software on a computer system, acquire an operation log indicating the operation and context information indicating a status of the operation;
divide the operation log for each of the plurality of operations into groups based on a similarity between the context information;
for each group, execute abduction by applying knowledge data indicating a relationship between an action plan executed by the software and the operation of the software to the operation log included in the group;
for each group, use a result of the abduction to estimate the action plan to reach a preset target state, that is executed by the software from which the operation log is acquired, based on the operation indicated by the operation log included in the group;
for each group, specify the operation required for establishing an element that is not directly linked to the operation log included in the group;
for each of the plurality of operations, estimate the context information indicating the status of operation by using context information of the operation log;
for each group, generate a message about the estimated action plan by using the estimated context information; and
for each group, externally output the estimated action plan and the generated message.

2. The action plan estimation apparatus to claim 1, wherein the instructions are executable by the at least one processor to further:
for each group, apply the operation log included in the group to knowledge data for the group to execute deduction;
for each group, use a result of the deduction to specify a new operation derived from the operation indicated by the operation log included in the group;
for each group, add the operation log indicating the specified new operation to the group; and
estimate the action plan executed by the software for each group to which the operation log indicating the new operation has been added.

3. An action plan estimation method, comprising:
acquiring, by a processor and for each of a plurality of operations performed by software on a computer system, an operation log indicating the operation and context information indicating a status of the operation;

dividing, by the processor, the operation log for each of the plurality of operations into groups based on a similarity between the context information;

executing, by the processor and for each group, abduction by applying knowledge data indicating a relationship between an action plan executed by the software and the operation of the software to the operation log included in the group;

using, by the processor and for each group, a result of the abduction to estimate the action plan to reach a preset target state, that is executed by the software from which the operation log is acquired, based on the operation indicated by the operation log included in the group;

specifying, by the processor and for each group, the operation required for establishing an element that is not directly linked to the operation log included in the group;

estimating, by the processor and for each of the plurality of operations, the context information indicating the status of operation by using context information of the operation log;

generating, by the processor and for each group, a message about the estimated action plan by using the estimated context information; and externally outputting, by the processor and for each group, the estimated action plan and the generated message.

4. The action plan estimation method to claim 3, further comprising:

applying, by the processor and for each operation, the operation log included in the group to knowledge data for the group to execute deduction;

using, by the processor and for each group, a result of the deduction to specify a new operation derived from the operation indicated by the operation log included in the group;

adding, by the processor and for each group, the operation log indicating the specified new operation to the group; and estimating, by the processor, the action plan executed by the software is estimated for each group to which the operation log indicating the new operation has been added.

5. A non-transitory computer-readable recording medium storing a program executable by a computer to carry out:

acquiring, for each of a plurality of operations performed by software on a computer system, an operation log indicating the operation and context information indicating a status of the operation;

dividing the operation log for each of the plurality of operations into groups based on a similarity between the context information;

executing, for each group, abduction by applying knowledge data indicating a relationship between an action plan executed by the software and the operation of the software to the operation log included in the group;

using, for each group, a result of the abduction to estimate the action plan to reach a preset target state, that is executed by the software from which the operation log is acquired, based on the operation indicated by the operation log included in the group;

specifying, for each group, the operation required for establishing an element that is not directly linked to the operation log included in the group;

estimating, for each of the plurality of operations, the context information indicating the status of operation by using context information of the operation log;

generating, for each group, a message about the estimated action plan by using the estimated context information; and externally outputting, for each group, the estimated action plan and the generated message.

6. The non-transitory computer-readable recording medium according to claim 5, wherein the program is executable by the computer to further carry out:

applying, for each operation, the operation log included in the group to knowledge data for the group to execute deduction;

using, for each group, a result of the deduction to specify a new operation derived from the operation indicated by the operation log included in the group;

adding, for each group, the operation log indicating the specified new operation to the group; and estimating the action plan executed by the software is estimated for each group to which the operation log indicating the new operation has been added.

* * * * *